US008379048B2

(12) United States Patent
Samworth

(10) Patent No.: US 8,379,048 B2
(45) Date of Patent: Feb. 19, 2013

(54) USER ADJUSTABLE GAMUT MAPPING AND CONVERSION OF IMAGES FROM A SOURCE COLOR SPACE TO A DESTINATION COLOR SPACE INCLUDING PRIMARY AND REDUNDANT COLORS

(75) Inventor: Mark Samworth, Wilmington, DE (US)

(73) Assignee: Esko Software BVBA, Ghent (BE)

( * ) Notice: Subject to any disclaimer, the term of this patent is extended or adjusted under 35 U.S.C. 154(b) by 967 days.

(21) Appl. No.: 12/114,269

(22) Filed: May 2, 2008

(65) Prior Publication Data

US 2008/0273794 A1 Nov. 6, 2008

Related U.S. Application Data

(60) Provisional application No. 60/927,779, filed on May 4, 2007.

(51) Int. Cl.
G09G 5/02 (2006.01)
(52) U.S. Cl. ......................... 345/594; 345/604
(58) Field of Classification Search ........................ None
See application file for complete search history.

(56) References Cited

U.S. PATENT DOCUMENTS

| | | | |
|---|---|---|---|
| 4,614,967 A | 9/1986 | Sayanagi | |
| 4,774,567 A | 9/1988 | Stansfield et al. | |
| 4,812,899 A | 3/1989 | Kueppers | |
| 4,878,977 A | 11/1989 | Kueppers | |
| 5,528,339 A | 6/1996 | Buhr et al. | |
| 5,528,377 A | 6/1996 | Hutcheson | |
| 5,650,942 A | 7/1997 | Granger | |
| 5,687,300 A | 11/1997 | Cooper | |
| 5,689,349 A | 11/1997 | Plettinck et al. | |
| 5,734,800 A | 3/1998 | Herbert et al. | |
| 5,751,326 A | 5/1998 | Bernasconi | |
| 5,870,077 A * | 2/1999 | Dillinger et al. | 345/600 |
| 6,791,716 B1 | 9/2004 | Buhr et al. | |
| 6,850,342 B2 | 2/2005 | Woolfe et al. | |
| 6,898,312 B2 | 5/2005 | Schröder | |
| 7,035,460 B2 | 4/2006 | Gallagher et al. | |
| 7,116,338 B2 | 10/2006 | Fukao | |
| 7,123,380 B2 | 10/2006 | Van de Capelle | |
| 7,598,964 B2 * | 10/2009 | Olson | 345/594 |
| 2003/0053094 A1* | 3/2003 | Ohga et al. | 358/1.9 |
| 2003/0128246 A1 | 7/2003 | Redding et al. | |
| 2003/0234943 A1* | 12/2003 | Van Bael | 358/1.9 |
| 2005/0195415 A1* | 9/2005 | De Baer | 358/1.9 |
| 2006/0164556 A1* | 7/2006 | Samadani et al. | 348/649 |

OTHER PUBLICATIONS

EP Examination Report dated Nov. 19, 2009.
Winne, Dominque; International Search Report; Sep. 9, 2008; 13 pp; Rijswijk, NL.
Fernandez, S. R., "Observer Preferences and Cultural Differences in Color Reproduction of Scenic Images", Journal of Imaging Science and Technology, vol. 49, No. 1, Jan./Feb. 2005.
Hunt, R. W. G., et al., "The Preferred Reproduction of Blue Sky, Green Grass, and Caucasian Skin in Colour Photography", Journal of Photographic Science, vol. 22, p. 144, (1974).
De Ridder, H., "Naturalness and Image Quality", Journal of Imaging Science and Technology, vol. 40(6), p. 487, (1996) Abstract.

* cited by examiner

Primary Examiner — Kee M Tung
Assistant Examiner — Carlos Perromat
(74) Attorney, Agent, or Firm — RatnerPrestia

(57) ABSTRACT

A method and software for converting a digital representation of a reference image to a preferred representation having higher chroma in selected subject areas.

35 Claims, 4 Drawing Sheets

USER ADJUSTABLE GAMUT MAPPING AND CONVERSION OF IMAGES FROM A SOURCE COLOR SPACE TO A DESTINATION COLOR SPACE INCLUDING PRIMARY AND REDUNDANT COLORS

CROSS REFERENCE TO RELATED APPLICATIONS

This application claims benefit of priority of U.S. Provisional Application No. 60/927,779, filed May 4, 2007, the entire disclosure of which is incorporated herein by reference.

BACKGROUND OF THE INVENTION

Color is perceived by the human eye according to three attributes: lightness, chroma, and hue. Lightness roughly relates to the amount of light coming from the observed object (by emission or reflection), and is a quantitative parameter with a value ranging from 0 to 100. Chroma, also referred to as color saturation, relates roughly to how pure the color is (i.e., higher chroma values are less gray; gray has a chroma value of zero, and is also a quantitative parameter with a value ranging from 0 to 127. Hue is the qualitative characteristic of color that is usually referred to by name (green, red, purple, etc.), and ranges from a value of 0° (magenta) through 90° (yellow), 240° (cyan) and finally returns to 360° (magenta).

Traditional printing processes use four process colors (cyan, magenta, yellow and black; C, M, Y and K) to replicate an image. Hues other than C, M, and Y are produced by combining inks. For example, orange (O) is produced by combining M and Y, green (G) is provided by combining Y and C, and blue (B) results from combining C and M. However, since CMYK is a subtractive color system, arriving at orange, green, and blue by using two pigments instead of one tends to increase the grayness of the resultant color, i.e., it limits chroma.

Therefore, a CMYK color set has a rather limited "gamut." The gamut of a given set of inks is the locus of points in the three-dimensional lightness-chroma-hue space that can be reproduced by that ink set. To address the limitations of CMYK as to the chroma that can be produced at any given hue, processes using more than four inks have been developed to increase the color gamut. Typically, separate orange, green and blue inks are added. Such colors are referred to herein as "redundant" colors because they provide a hue that is already obtainable by combining two primary colors (C, M, Y). However, their use confers certain significant advantages.

By using inks of these colors, it is possible to rely less upon the use of combinations of two ink pigments (which limits available chroma) to produce a given hue. Thus, including these redundant process colors along with the "primary" (CMYK) colors expands the gamut in the sense that it allows the production of higher chroma in those images areas in which they are used to partially replace two primary colors. Any (and typically, all) of these three additional colors may be used, and still further ones may be added without any theoretical limit.

To reproduce and print an image on a printing press, the image is typically provided in digital format by an image capture device (e.g., from a digital camera or scanned by a color scanner), and software then converts the image into a map that specifies how much of each of the process colors (C, M, Y and K) to apply to the printed page. Methods for specifying an appropriate amount of each of the process colors to faithfully reproduce the original color, as that color would be measured by an objective evaluation (such as by a calorimeter or spectrophotometer measuring CIE LAB values, or the like), are known in the art. Such methods are available for CMYK and CMYKOGB color sets, and they can faithfully reproduce the original color as it would be measured by an objective evaluation method (such as by a calorimeter or spectrophotometer measuring CIE LAB values or the like). Printed single-color samples produced by such methods are found by a majority of human evaluators to provide a very good match for the original colors. Of course, this requires that the evaluators make a direct visual comparison between the original scene or transparency and the colors in the printed reproduction.

Typically, the gamut of colors than can be achieved on a printing press is smaller than the gamut of colors in the original scene or color transparency. The process of mapping color from a larger color gamut (e.g., an original scene) to a smaller color gamut (printing press) is knows as "gamut compression." Gamut compression, by definition, results in different colors in the final print than in the original scene. While less gamut compression is required for a CMYKOGB color set than a CMYK color set, some compression is usually inevitable. However, in most cases it is desirable to avoid or reduce gamut compression as much as possible.

Typical methods for compressing gamut involve reducing chroma in an amount that is in some way proportional to the chroma of the original scene or transparency: High chroma colors receive a larger amount of chroma reduction, low chroma colors receive a smaller amount of chroma reduction. Hence, the chroma value in the reproduction produced according to such mathematically proportional approaches might be called the "proportional chroma." Numerous mathematical models exist which attempt to objectively define this relationship based solely on the color values (LAB, LCH or other) of the two color spaces. However, printed images of realistic scenes (i.e., photographs) produced according to (such) mathematically objective methods are not always found by a majority of human observers to be most pleasing. Rather, research has shown that a majority of evaluators will prefer certain subjects (e.g., green grasses, or blues skies) to be reproduced with a chroma level higher in comparison to other subjects in the original scene (or higher than their "proportional chroma"). Research has also shown that a majority of evaluators will prefer other subjects (e.g., human skin tones) to be reproduced with a chroma level lower in comparison to other subjects in the original scene (or lower than their "proportional chroma"). Even in the case where no gamut compression is required, the tendency of observers to prefer subjects like green grass, blue sky, and many "synthetic" subjects (i.e., synthetically painted, dyed, etc. subjects) to have higher chroma than the original scene has been documented.

The main point is that color preferences of pictorial images are not related solely to the mathematical attributes of colors in the images, but also to the subject matter. These preferences are thought to be related to psychology and a human's experience with specific subjects. A human fleshtone with a chroma that is higher relative to the other colors in the scene may give the observer the impression that the person is unhealthy. The exact same mathematical color in a different subject—say a "peach colored" sweater—can be reproduced (and may be preferred) at a chroma even higher than the proportional chroma. For all of these reasons, it would be useful for a user to be able to specify how much gamut compression to provide in different color areas of an image according to the subject matter, not just according to mathematical color values.

SUMMARY OF THE INVENTION

In one aspect, the invention provides a method of converting a source image representing a reference image to a digital representation of a preferred image, wherein the source image includes pixels rendered in a first color space and the representation of the preferred image is rendered in an extended gamut color space obtainable with a colorant set including cyan, magenta, yellow and at least one redundant color other than black. The method includes the steps of:

a) determining source values of lightness, chroma, and hue for each of the pixels in the source image;

b) assigning to each of the pixels a preferred chroma value according to a preselected mathematical function dependent upon the source lightness value, the source chroma value, or the source hue value, the preferred chroma value being within the extended gamut color space at the source lightness value and the source hue value; and c) storing the digital representation of the preferred image on a computer readable medium in the form of computer readable code, wherein the digital representation of the preferred image represents for each pixel the source lightness value, the source hue value, and the preferred chroma value.

In another aspect, the invention provides a method of converting a source image representing a reference image to a digital representation of a preferred image, wherein the source image includes pixels rendered in a first color space and the representation of the preferred image is rendered in an extended gamut color space obtainable with a colorant set including cyan, magenta, yellow and at least one redundant color other than black. The method includes the steps of:

a) determining source values of lightness, chroma, and hue for each of the pixels in the source image;

b) rendering the source image in CMYK format;

c) separating CMYK components of the source image into chromatic and achromatic components, the achromatic components including at least black;

d) determining LCH from the two largest chromatic components;

e) assigning to each of the pixels a preferred chroma value according to a preselected mathematical function dependent upon the source lightness value, the source chroma value, or the source hue value, the preferred chroma value being within the extended gamut color space at the source lightness value and the source hue value;

f) from the resulting LCH values of step e), determining a corresponding 3-color value consisting of the two largest chromatic components and a redundant color that corresponds to the two largest chromatic components;

g) combining the 3-color value with at least the black achromatic component to form a pixel of the preferred image including at most 5 colors; and h) storing the digital representation of the preferred image on a computer readable medium in the form of computer readable code, wherein the digital representation of the preferred image represents for each pixel the source lightness value, the source hue value, and the preferred chroma value.

DETAILED DESCRIPTION OF THE INVENTION

Figure 1:
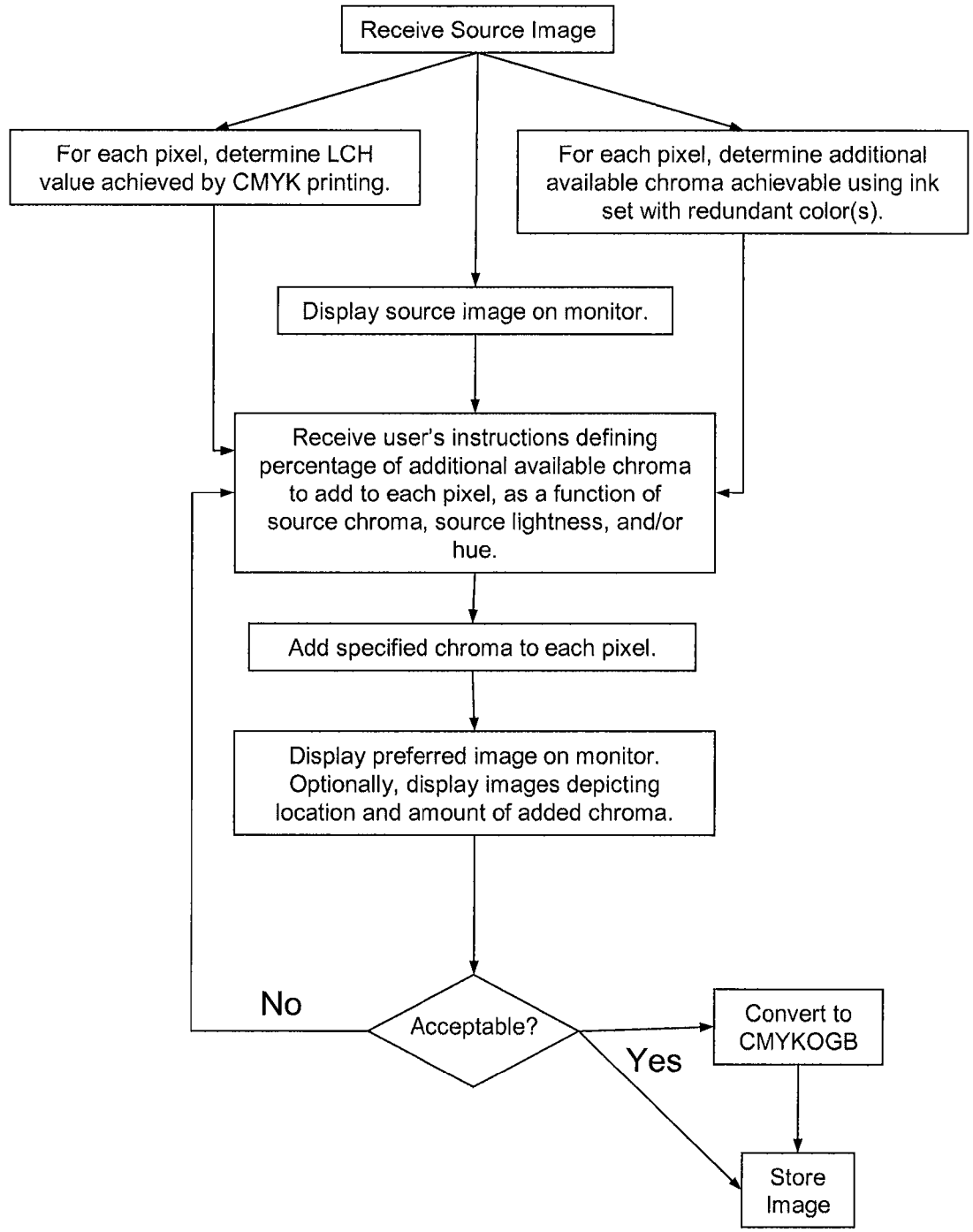
FIG. 1 is a schematic diagram of a method of converting a source digital image to a preferred digital image having added chroma in selected areas, according to the invention.

The invention provides methods of converting a digital representation of a source digital image to a preferred digital image having added chroma in selected areas, and methods for converting the preferred digital image to pixels in a printing press color space that includes one or more redundant colors. The method provides a user with the ability to make judgments of how the expand the gamut of the source image by referring to a "reference image". As used herein, the term "reference image" means a physically viewable image that is to be reproduced, and a "source" image is a digital representation of the reference image. It may be in any format, but will typically be in one of the common color spaces (RGB, LAB, CMYK). It is the source image that is subjected to chroma expansion according to the invention to arrive at the preferred digital image.

The reference image is the image that the user is looking at—or even thinking about—when making judgments about gamut mapping. In most embodiments the source and reference images are rendered in the same color space. The most common case is converting a CMYK image to 7 color wherein both the source color space and the reference color space are press CMYK. That is, the user is converting an image that is CMYK, hence the source color space is CMYK. In making judgments, the user is looking at some representation of how it will appear when printed with CMYK, and so the reference color space is also CMYK.

But the user may instead start with a source image in RGB, LAB or other color space, and nonetheless use a printed CMYK as the reference image when making judgments of gamut mapping. By using printed CMYK as a reference color space, the user can see how much gamut is lost in the process of converting from RGB to press CMYK. The user can then decide which colors they wish to expand back through gamut expansion. In such cases, the reference color space is different than the source color space.

Color information for various devices is obtained in this invention by looking up colors in color profiles. Such profiles and lookup techniques are known in the art. A brief description is provided for clarity. A color profile is basically a lookup table in computer readable form that relates one color space (e.g. CMYK) to another color space (LAB). An industry standard format for such a profile is known as an "ICC Profile" (International Color Consortium), however, other formats exist and are said the have certain advantages. Both can be used in this invention. Such profiles have two directions, a forward and a backward direction. In many parts of this invention there are steps to convert a pixel from one color space (say CMYK) to another color space (say LAB). This is done by looking up the CMYK value in the appropriate color profile (say the CMYK profile of the printing press). Such a lookup is a forward lookup. The printed CMYK resulted in the LAB. There is only one combination of LAB that can be produced by a CMYK. As such, a direct lookup is all that is required.

In other parts of this invention, there are steps to determine the a set of color values (say CMYKOGB inks) required to match a given LAB value. Such a lookup is a backward lookup. Although the printing of the 7 inks resulted in an LAB, there is a need to convert the LAB back into some combination of the seven inks. There are often many combinations of the seven inks that can match an LAB. These are known as redundancies. There are many ways of working with such redundancies and some are describes specifically as part of this invention. Ways of searching ICC profiles backward to control such redundancies are known in the art. For example, to convert a pixel from LAB to only the OMY of the CMYKOGB profile, a forward search is performed with iteration changes of OMY in the CMYKOGB profile until the combination that matches the LAB is found. In this way, the LAB has been converted to OMY with a unique solution. Such techniques are known in the art. The specific ways that these are used are described herein.

The inventor will first describe specific image conversion situations that present challenges to the artisan, and then detail how those challenges can be addressed by practice of the invention.

The inventor has found that, as the printing industry moves from 4 color process printing (CMYK) to the use of additional colors (CMYKOGB), users commonly employ a CMYK reproduction of the scene as the reference image, instead of using the original scene itself or some other seemingly more appropriate representation. The reason for this apparent preference by many users is not fully understood. However, without wishing to be bound by any particular theory or explanation, the inventor speculates that it may derive from the fact that the CMYK reproduction is both mathematically quantifiable and easily observable by the user. In contrast, in most cases there is no way to really know the color values in the original scene. This preference for using a CMYK reproduction as the reference image appears not to be widely recognized in the literature, perhaps due to the rapid pace at which conventional (i.e., film based) photography is being replaced with digital photography. This preference persists, likely due to the fact that more recently most images are captured directly on digital cameras and therefore traditional analog reference images (color reflection prints or transparencies) are rarely available.

The accuracy with which color transparencies or reflection prints reproduce the colors of the original scene is itself the subject of much study and debate. However, even in the common case where such analog images do not provide fully accurate color reproduction, they are still typically used as reference images to which the prepress reproduction process can be calibrated. In other words, in the case where a color transparency or reflection print exists, many artisans seek to reproduce the color transparency or reflection print, rather than the original scene. In the case of digital photography, no such physical reference image exists. In this situation, it would seem that the obvious adaptation would be to use the original scene itself as the reference image. However, such an adaptation is not as simple or as practical as it might at first seem, because the variables of time, size, and perspective come into play when attempting to use the original scene as the reference image.

Consider an outdoor photograph of a car on the cover of a car brochure. Any outdoor shot has a color space unique to the moment at which the picture was taken. The simple movement of a cloud changes the colors of the outdoor scene to a large degree. An indoor reproduction under perfectly controlled lighting offers the potential for a mathematical model of original scene gamut, but even this case has a very different size and perspective than the small car picture on the front of the brochure. And since size and perspective have also been shown to influence an observer's perception of color, the relationship between real life scene and printed piece is not easily quantifiable. Thus, use of the original scene as the reference image is impractical in many situations.

Regardless of the exact reasons, the applicant has observed that users printing with 5, 6, or 7 colors commonly use a CMYK reproduction of the original scene as the reference image, and they appear to think in terms of how to expand the gamut of the different subjects relative to that CMYK reproduction. Mathematical models exist for expanding color from a smaller color space into a larger color space, such models being essentially the reverse of gamut compression models. However, such gamut expansion models share some of the same shortcomings as gamut compression models—namely that they do not allow the user to take subject matter considerations into account to arrive at a preferred reproduction. These models account only for the colors in the scene, not for the subject matter.

It should also be noted that, even if ways were available to quantify the colors in the original scene, a method that allows a user to selectively control only gamut compression with respect to the original scene would still be inadequate. This is because although the overall gamut of the original scene is larger than the overall gamut of the CMYKOGB image, there are portions of the color space where the gamut boundary of the CMYKOGB image exceeds that of the original scene. This is significant, because the inventor has found that in many cases, users prefer to go beyond the gamut of the original scene if possible. A blue sky might be one example. The chroma that can be achieved with CMYKOGB inks is above the actual chroma of most blue skies. In most cases, users would like to extend the chroma of the blue sky in the reproduction beyond that of the sky of the original scene, if additional chroma is available. Importantly, in the case where the original scene is used as the reference image, the user must be able to consider both gamut compression and gamut expansion. The confusion this causes may be another reason why users have moved toward using the CMYK reproduction as the reference image, with respect to which only gamut expansion (but not compression) must typically be considered. Nonetheless, there is a need for a tool that enables the user to specify how much gamut compression or expansion to apply in different colors of the original scene and to make this judgment based on subject matter.

The invention addresses the above issues by enabling a user to specify how much gamut expansion is desired in different colors of the reference image. The user may make subject-dependent adjustments to chroma in various parts of an image when converting from a larger color space (e.g., an original scene RGB) to a smaller color space (press CMCYKOGB) or from a smaller color space (press CMYK) to a larger color space (original scene CMYKOGB). In other situations, one of the color spaces may be smaller than the other in certain regions but larger in others.

For simplicity of explanation, the inventor will discuss the typical situation where the reference image is a CMYK reproduction and the source image is also in CMYK format. The preferred image (i.e., including expanded chroma) will typically be referred to as a CMYKOGB image, since that is likely to be the most common situation, but it is to be understood that more or fewer redundant colors may be used according to the invention.

The present invention provides methods and computer software for receiving a color image (for example from a digital camera or a scanner) and deriving from that image a printed image using CMYK plus additional colors. The user can preview the image on a monitor to assess subject content and to selectively increase the chroma in user-specified areas of the image, identified with respect to one or more of the three color parameters (lightness, chroma, and hue). Using techniques known in the art, the monitor can be calibrated to show how the image will appear when printed on the press.

As used herein, the term "hue sector" will be used to refer to all of the hues to which one of the redundant colors is capable of contributing. For example, the orange (O) hue sector includes all hues between magenta and yellow. Similarly, the green (G) hue sector ranges from yellow to cyan, and the blue (B) sector ranges from cyan to magenta. Thus, there are three hue sectors when orange, green and blue are used as redundant colors. Note that additional redundant colors may also be added. For example, an eight-color image (e.g., including red as well as orange, green and blue) would have four hue sectors. Fewer redundant colors may also be used, and the methods of this invention may be used with any number of redundant colors. The seven-color case will be described herein for simplicity.

As used herein, the term "reference" chroma or "reference" lightness of an image feature refers to the level of chroma or lightness afforded by the reference image. In some embodiments, the reference image will be a printed CMYK image as produced by traditional color separation according to a CIE LAB, RGB, or other standard 4-color separation method. More commonly, the reference image will be a "proof," which is essentially a prediction of how the CMYK image will appear under a given set of CMYK printing conditions (typically the CMYK of the 7 color set). The proof is typically either a video display or a reflection proof made to match the ultimate set of printing conditions, using color management techniques known in the art. Alternatively, it may be a digital image rendered in LCH or RGB format.

"Expanded" chroma refers to values of these parameters higher than those of the source image corresponding to the reference image. It should be noted that any number of additional process colors may be used, thus creating additional color sectors, but for simplicity the present disclosure will consider the exemplary situation where orange, green and blue are added; a so-called "CMYKOGB" color set. "Maximum" chroma means the highest available value of chroma that does not result in a change in lightness or hue. In the Figures, this level is indicated as 100% "added" chroma, where "added" means in addition to the source chroma.

Determination of Maximum Chroma

Figure 5:
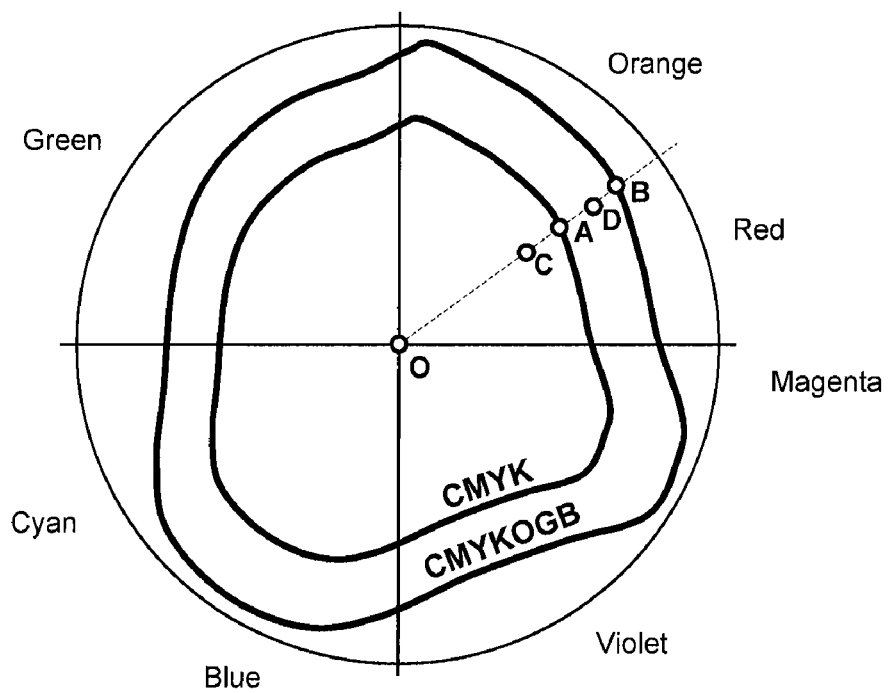
FIG. 5 is a color space map, illustrating the concept of reasonable maximum chroma as defined in this disclosure.

For any pixel in a digital image, there exists for any given set of inks a maximum chroma value that can be produced without changing the lightness or hue values of the pixel. This value is referred to herein as the absolute maximum chroma (AMC). For a given ink set, AMC is the same for all pixels with the same L and H value, regardless of the chroma of that pixel in the source image. This is illustrated in FIG. 5, where all colors located on the hue line between point O (the origin) and point A that have the same L value (not shown; plotted on an axis perpendicular to the page) would have the same absolute maximum chroma value (point B).

Alternatively, a reasonable maximum chroma (RMC) may be calculated, having a value at most that of the AMC but typically less. The RMC is that value beyond which a reasonable person would not be likely to increase the chroma of a given pixel, and its value typically depends upon the chroma of the pixel in the source image. Referring again to FIG. 5, the reasonable maximum chroma for point A would be point B (i.e., the same as the AMC), but the reasonable maximum chroma for point C might be something like point D. Note that for pixels with less than the maximum chroma in the source image, the reasonable maximum chroma is somewhat arbitrary. In practice, using a value that is just higher than a user would ever desire for an extreme image provides the user with a full range of choices, and such a value might be defined as the reasonable maximum chroma.

Figure 7:
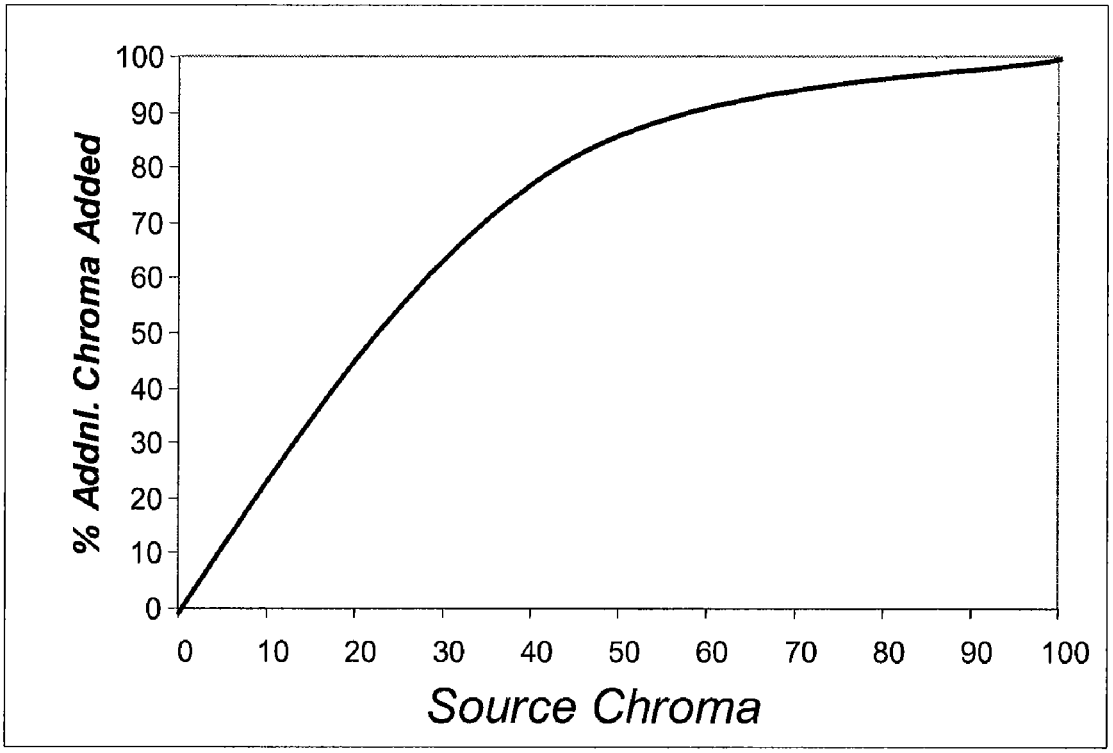
FIG. 7 shows one possible exemplary curve indicating the maximum percentage of additional achievable chroma that it might be reasonable to add to the chroma of the source image, according to the invention.

A number of ways may be conceived of for determining reasonable maximum chroma, and all of these are contemplated according to the invention. One approach is to empirically derive a curve that relates the chroma of the source image to the chroma of the reproduced image in such a way that the points on the curve represent the maximum amount that the chroma can be expanded and still have an acceptable look for the most extreme images. Research of observer preferences of pictorial images has documented a characteristic known as "naturalness." In brief, users prefer to increase the chroma of most subjects up to a point slightly less than that which can be subjectively quantified as "unnatural." For some subjects, like skin tones, users prefer to stay well below this point, for other subjects, such as synthetic objects, users prefer to go beyond this point (as such subjects have no natural reference). Hence, the reasonable maximum chroma curve would be the range of values which produces the maximum amount of "unnaturalness" tolerable for a broad range of images. FIG. 7 shows one possible exemplary curve indicating the maximum percentage of additional achievable chroma that it might be reasonable to add to the chroma of the source image. The exact details of the curve would in actuality be based on an assessment as to what limits of chroma increase a user would rarely (if ever) exceed. In general, the amount of added chroma will typically increase chroma over the entire range of chroma found in the source image.

Reasonable Maximum Chroma Via Grey Component Replacement (GCR)

One way to arrive at an objective determination of reasonable maximum chroma is to separate the source CMYK image into its grey component (K) and its chromatic (CMY) components, using GCR techniques known in the art. An absolute maximum chroma expansion can then be performed on the chromatic components (CMY) by calculating the maximum possible replacement of the two chromatic components (e.g., M and Y) with the redundant color (e.g., orange). The new O, M, and Y values are then combined back with the K component and the new chroma calculated, thus generating an objectively defined reasonable maximum chroma.

For example, consider a red color with the following CMYK values: C20, M100, Y70, K10. This pixel might have a chroma of 65 in the CMYK source color space. Using a 100% GCR technique, this pixel might convert into C0, M95, Y55, K30 (and, according to the principles of accurate GCR conversion, retain the same lightness, chroma, and hue values). The chromatic components of this pixel are M95, Y55, and the achromatic component is K30. The chromatic component of M95, Y55 has a lightness of 53, a hue of 22° and chroma of 78. A lookup in the ICC (or other) profile of colors that can be made using the color orange reveals that the combination of O61 and M87 also produces a lightness of 53 and a hue of 22°, but produces a chroma of 85. No higher chroma can be achieved at this lightness and hue. Therefore, O61, M87 is combined back with the K30, resulting in a pixel with L42 C72H17°. Hence, the reasonable maximum chroma for a pixel with the value L42 C62H17° is 72, i.e., 10 points higher than the chroma of the source pixel.

In practice, when maximizing chroma of the chromatic component and combining it back with the achromatic component, there may be a small shift in L and H. For example the original value of a L42 C62H17° may convert to L40 C70H20°. Minor adjustments can then be made to keep the lightness and hue the same as those of the source pixel. Such adjustments can be made through search routines of the color profile. In this example, adjusting L and H back to the original values results in a C of 72. Hence, the reasonable maximum chroma is 72. There would never (or very rarely) be a case where the user would desire to expand the chroma of this pixel beyond C of 72. Using this definition, colors with a low achromatic component (high chroma colors) have a high reasonable maximum chroma while colors with a high achromatic component have a low reasonable maximum chroma. If reasonable maximum chroma is defined in this way, an image produced with every pixel at RMC would have chroma that appears somewhat unnaturally high. In some embodiments of the invention, RMC is calculated in this way, and then the user may back off from these maximum values as desired, based on subject-specific preferences.

Optimizing Chroma

According to the invention, the user views and refers to a reference image as part of a process of deciding the location and amount of chroma expansion to apply in order to arrive at a final, preferred digital image suitable for printing. Examples of reference images are photographic transparencies, reflection prints, and images on a computer monitor. Such reference images may be accurate representations of an original scene, or less than accurate representations, and the goal then becomes to arrive at an optimized chroma expansion while leaving L and H unchanged. Or, the reference image may be an original scene itself (e.g., a human or other subject in a photo studio). In all of these cases, a source image (i.e., a digital representation of the reference image) is provided, typically rendered in RGB color space. However, LAB, CMY, CMYK, or any other color space may be used instead.

In other cases the reference image may be a printed CMYK image, which typically is not a highly faithful color representation of the original scene. For example, the reference image may be a printed reproduction of CMYK data derived from an original scene. The reference image may also be a monitor display of an expected printed reproduction of CMYK data derived from an original scene. In such CMYK-based situations, the color space in which to render the digital representation of the reference image is typically CMYK, although CMY, RGB, or any other color space may also be appropriate. In such cases, the CMYK acts as the source image.

The invention provides a user with the ability to choose, within any given image, how much chroma expansion to provide in each of the hue sectors in different subject areas of the image. These adjustments may be made by specifying, for each hue sector, a function defining the level of chroma expansion with respect to any or all of the three color attributes of lightness, chroma and hue. The following discussion will describe exemplary methods of optimizing chroma expansion by determining the maximum level of expansion of which the colorant set is capable (without changing lightness or hue), and then selectively backing off from that maximum value by some amount defined by the user, thereby arriving at a pleasing image. However, an alternative and equivalent approach may be taken in which chroma is selectively increased from the level present in the reference image, arriving at the same result. Additionally, the original scene may be used as the reference image, and the user control may enable the user to compress or expand colors relative to the original scene. The reference image is either the actual scene itself (e.g., the object itself in a photo studio), an analog reproduction of a scene (such as a color transparency or reflection print), or a digital rendering thereof. The digital rendering may for example be obtained as a digital photographic image or a digitally scanned copy of an analog image (e.g., from scanning a KODACHROME® transparency). Using the methods and devices of this invention, the user is able to apply editorial judgment to color separation in a highly configurable and selective way such that the reproduction can be optimized for specific subjects according to user preferences.

Attention is now drawn to FIG. 1, which shows a basic sequence of steps that may be followed to form enhanced images according to one exemplary embodiment of the invention. Suitably, the steps may be accomplished by a computer using appropriate software. The software is in the form of a computer readable medium comprising computer readable code, wherein the computer readable code is suitable for providing instructions to the computer to execute the steps of FIG. 1 as follows. Software modules and subroutines suitable for performing each of these steps are available and known to those of ordinary skill in the art.

To begin, software receives a source image in digital format from an image capture device, rendered in CMYK, CMY, RGB, LAB or other color space. This example will use a CMYK image. LCH values are then derived from the CMYK values of the source image through lookup in the color profile of the CMYK printing conditions.

Throughout the methods of this invention, LAB and LCH values are inter-converted by the software as needed at various points to allow communication between the user (whose perception of the image is in terms of the sensory parameters of LCH, expressed in polar coordinates) and the computer (which renders color space in a Cartesian format such as LAB).

The software displays the source image on a monitor such that the user can clearly recognize image content (at a minimum) and preferably can see colors with colorimetric accuracy representing how they will appear when later printed on a press. The software determines the lightness, chroma and hue values corresponding to the LAB values for at least some of the pixels (ideally, all of them, although representative sampling may also be used). For each of these pixels, the software also determines the absolute maximum or reasonable maximum chroma (depending upon the embodiment) achievable by printing with the expanded ink set, i.e., one that includes at least one redundant color in addition to cyan, magenta and yellow (and optionally black).

The difference between the maximum and source chroma values defines the additional chroma that is potentially available for printing the pixel. Any or all (or none) of that additional available chroma may then be added to each pixel as follows. The software receives instructions from the user, typically via a graphical user interface (GUI), defining the percentage of the additional available chroma to add to each pixel. The percentage is defined relative to the chroma, lightness, and/or hue of the source image. The software then assigns the prescribed amount of chroma to each pixel and optionally displays the resulting optimized-chroma image on the monitor. Optionally, it may also convert the images into the expanded color space and display the separate images for orange, green and blue as well as cyan, magenta, yellow, and black. If the results are satisfactory to the user, the preferred digital image is accepted. If not, the foregoing adjustments may be iterated until the desired result is achieved. The result is a digital representation of the preferred image in LCH (and thus, LAB) format. The image may be stored (typically in LAB format) on a computer readable medium in the form of computer readable code With a preferred image thus defined, it remains only to convert the image to CMYKOGB as a direct colorimetric match so that the image having the preferred chroma values may be printed. Numerous methods for doing this are known in the art, and any of these may be used. For example, a seven-color ICC profile may be used to convert LAB to seven colors with an exact colorimetric match. The resulting image may be stored and/or subsequently provided to a printing press, which produces a printed version of the preferred image.

The foregoing method might be considered an "indirect" way of producing an optimized image, because it proceeds via an intermediate step of converting the source image to LAB format, modifying the LAB to form a preferred image in LAB format, and then converting that image to CMYKOGB. That is, the chroma expansion step is performed on the image while it is in an intermediate (i.e., LAB) format. However, in another embodiment of the invention, the optimization may be performed more directly. In this method, chroma expansion is performed on the image in a CMYKOGB format, directly producing the preferred image in CMYKOGB format. This is preferably done in a way that removes all color redundancies other than the one that contributes directly to the desired expanded chroma. For example, in areas where orange is generated, the final pixel will in fact contain 4 colors—O, M, Y and K, because C, G and B will have been completely eliminated from that pixel. Thus, contaminant color redundancies from C, G and B are avoided entirely.

For the following reason, conversion to CMYK allows elimination of redundancies. Each of the CMY components of a pixel can be categorized as either chromatic or achromatic. Two of the components will always be chromatic; one will always be achromatic. Based on the two chromatic components, there will be only one appropriate extra color that can be generated. This is the extra color whose Hue (H of LCH) can be matched by some combination of the two chromatic components. For chromatic components of M and Y, the extra color to generate can only be orange. For chromatic components of C and Y, the extra color to generate can only be green. For chromatic components of C and M, the extra color to generate can only be Blue. Such a rule might be thought of as a "unique extra color rule" as there is only one extra color that can be generated in any CMYK pixel. There are many ways to create color profiles (ICC or other formats) with these restrictions or to search color profiles with these restrictions and these are beyond the scope of this invention. But the separation of CMYK pixels into chromatic and achromatic components and the application of the unique extra color rules are implicit in the direct approach.

There are two main embodiments of the direct approach: 1) A GCR approach and 2) a non-GCR approach. The GCR approach will be described first. In this approach, CMY or CMYK pixels are converted to three colors using a 100% GCR technique. For example, a pixel with the value C20, M100, Y70, K10 might convert to C0, M95, Y55, K30. With the only chromatic components being M and Y, the software applies the unique extra color rule whereby the only redundant color that can be employed is Orange. This eliminates all potential combinations that would use green or blue, and the problem of contaminating color redundancies is therefore eliminated. However, the LAB value corresponding to the resulting source MYK value can be matched by an infinite number of combinations of OMYK values. By eliminating K from both, the problem is reduced to using the source MY to generate an LCH then converting the LCH to OMY. There is only one combination of OMY that will match any given LAB (or LCH), and therefore the problem of redundancy is solved.

One specific sequence of steps to convert a pixel from CMY or CMYK to 5, 6, or 7 colors using the direct approach with 100% GCR is as follows:

1. Look up the source RGB or CMYK pixel in the source profile (i.e., the color profile of the device that produced the source image) to determine the L, C, and H values.
2. Convert RGB or CMYK pixel to a 100% GCR CMYK pixel using the CMYK destination profile (i.e., the color profile of the device that will produce the preferred image) or its equivalent. The modified pixels now each contain 2 chromatic components, plus black (e.g., MYK).
3. Look up the two chromatic components (e.g., MY, but not including K) in the source color profile to determine the LCH value.
4. Search the appropriate destination color profile to determine the absolute maximum chroma (AMC).
5. Modify the absolute maximum chroma according to mathematical functions defined by user-inputted preferences, thereby arriving at a preferred chroma value.
6. Search the destination (e.g., CMYKOGB) color profile to determine the three color values required to match the L and H of the original pixel while matching the preferred chroma. The result will be exactly three chromatic components (e.g., O, M, and Y)
7. Add the K that was eliminated in step 3 back to the three chromatic components. The result will be a four-color pixel (e.g., OMYK).
8. Optionally, lookup the four-color pixel in the destination color profile.

Compare the L and H values to the L and H values of the source pixel determined in step 1.

9. Optionally, modify the final four-color values as needed such that the L and H values match those of the source pixel. This may be accomplished by searching the destination color profile and adjusting accordingly, using iterative search approaches known in the art.
10. Store the final four-color pixel values.

A second embodiment performs the same steps as above, except that in step 2 the pixel is not converted to a 100% GGR pixel, but instead remains in standard CMYK format. The two largest of C, M and Y are considered to be the chromatic components for the purposes of step 3, while the smallest of C, M and Y (known in the art as the "grey" component) is not considered in step 3. As before, black is also not included in step 3. Thus, for a C20, M100, Y70 source pixel, only M100, Y70 are used in step 3 to convert to LCH through reference to the OMYK profile. Alternatively, step 3 may use M and Y values that have each been reduced by an amount equal to the grey component (C20 in this case). This would change the M100, Y70 to M80, Y50, and these values would be used in step 3. This approach changes the amount of chroma expansion, but in a system where the user can control the amount of expansion, it can be offset through user control.

As before, step 6 converts the two chromatic components to three chromatic components, thereby expanding chroma. Step 7 then adds back not only black (as before), but also the grey component (C20 in this example). It might be noted that whereas the 100% GCR embodiment results in a final pixel with at most 4 colors, non-GCR embodiments such as this one result in a final pixel with at most 5 colors. That is, the pixels might contain three chromatic components (e.g., M, Y, and O) as well as two achromatic components (C and K).

Although the first embodiment and the two foregoing alternatives of the second embodiment have been described in detail here, it is to be understood that combinations or blends of any of these approaches are also within the scope of the invention. For example, grey component replacement at less than 100% may be used.

Any of the foregoing sequences of steps for converting a source image to a preferred image may be performed on every pixel in the image, or may be performed using representative sampling of pixels. For example, a preselected sample of pixels may be used to construct a mathematical relationship between the source image and the preferred image. The relationship is then applied on a pixel by pixel basis to convert all of the pixels in the source image to the preferred image. Methods for creating and using such sampling relationships are known in the art.

Chroma Expansion Functions—General Considerations

Figure 2:
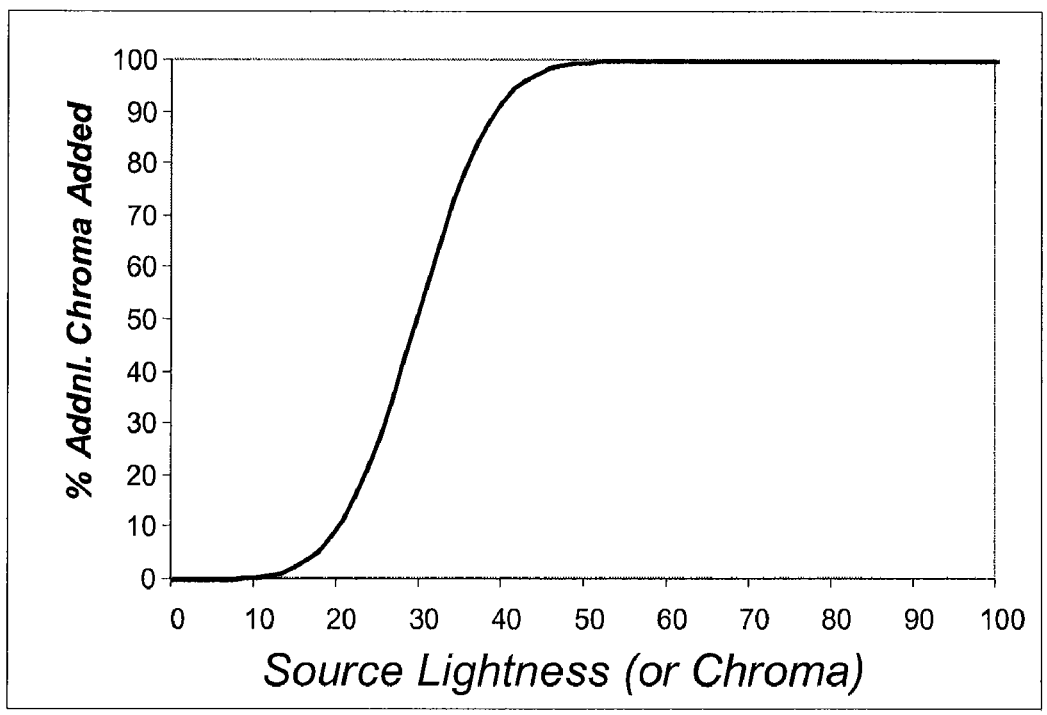
FIG. 2 is a graphical representation of an S-shaped mathematical function defining the amount of added chroma in selected areas as a function of source chroma or lightness, according to the invention.
Figure 6:
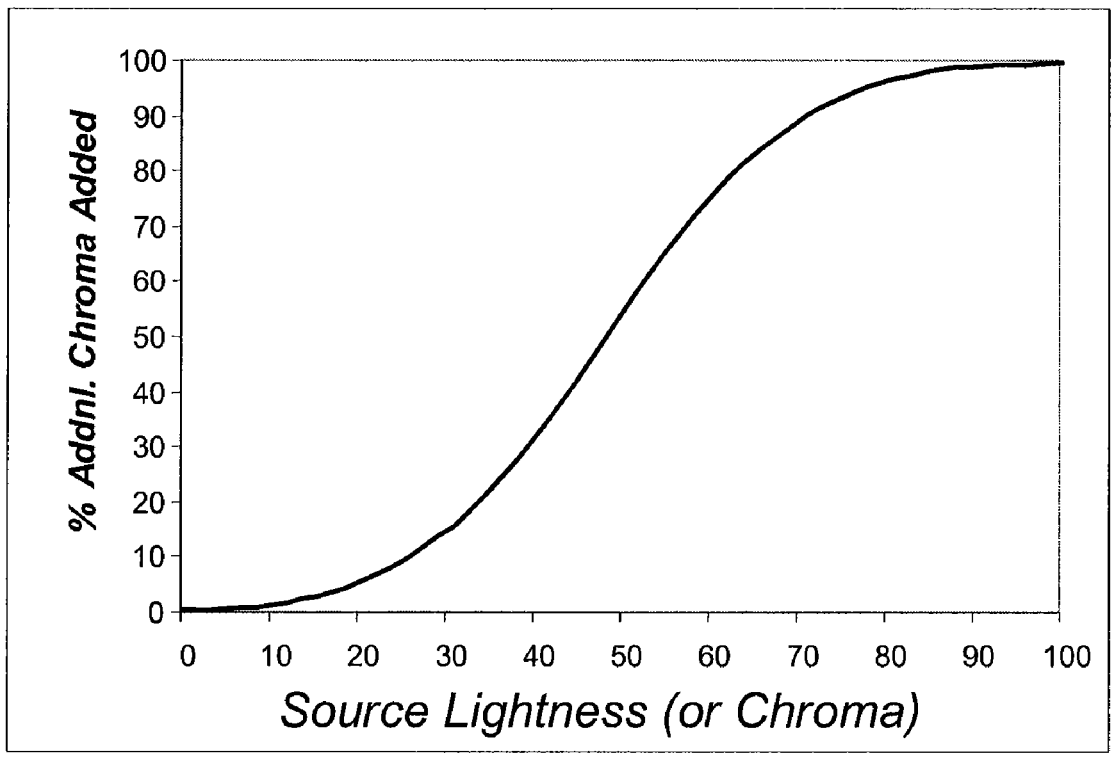
FIG. 6 is a graphical representation of an S-shaped mathematical function defining the amount of added chroma in selected areas as a function of source chroma or lightness, according to the invention.

Methods of producing and using chroma expansion functions will now be described. In those embodiments of the invention where the Y-axis of the chroma expansion function is defined with respect to AMC, and where the X-axis is chroma of the source image, the user will typically not use a function with a flat top at 100% such as shown in FIG. 2. With such an expansion function, colors with the same L and H and a chroma higher than 50 would be converted to the same color. This would result in a loss of detail in the image. Instead, a curve such as shown in FIG. 6 would typically be more useful. Such a curve would maintain a difference in chroma and hence maintain detail in the reproduction. It might be noted that a curve with a flat section at 100% AMC might work perfectly well where the X-axis is either hue or lightness (FIG. 4, or FIG. 2 where the X-axis is L, respectively). In such cases, pixels with different L or H could have the same maximum C and still be a different color in the final print.

Alternatively, in embodiments where the Y-axis designates additional available chroma with respect to RMC rather than AMC, a curve with a flat top at 100% (such as FIG. 2, or even FIG. 3) might be very reasonable even if the X-axis designates source image chroma. In such a case, colors with different values of C on the source image will maintain different C values on the preferred image because the same reasonable maximum chroma values correspond to different absolute maximum chroma values.

Chroma Expansion as a Function of Source Chroma

As an example, a user might desire to arrive at preferred values of chroma in various image areas of a photograph depicting a light brown wicker basket containing bananas, tangerines, limes and red apples. In this example, customized chroma expansion is defined according to functions of the source chroma values in each of the hue sectors. In one embodiment, the user begins by instructing the software to produce maximum chroma expansion in all hue sectors, consequently producing an image that most users would not find "natural" due to the extremely high chroma levels for orange, green, and blue in all image areas. Such a reproduction would give most subjects an "unnatural" appearance. The viewer might subjectively accept or even prefer such a look in some subjects, for example the fruits, but may not like it in the brown basket.

Figure 3:
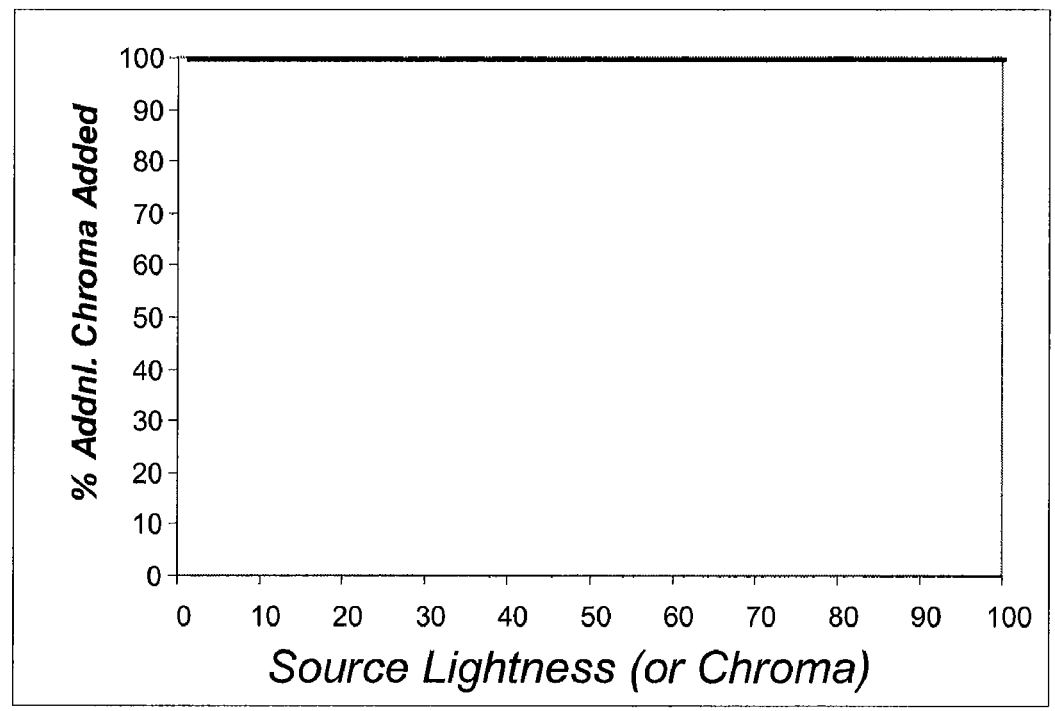
FIG. 3 is a graphical representation of a constant value mathematical function defining the amount of added chroma in selected areas, according to the invention.

For example, the basket has much lower chroma than the tangerine, the apple and the banana, particularly in the orange sector. Hence, a chroma expansion function that provided no expansion in neutral and near neutral (i.e., low chroma) image areas and increasing chroma expansion as source chroma increases would result in minimal increase in chroma in the brown basket (an area of low orange chroma) while providing significant chroma increase for the tangerine. Referring now to FIG. 2, the user can achieve this by setting the amount of added orange chroma to zero in areas where the source orange chroma level is less than some user-specified value (10 in this case), then increase the amount of added orange chroma until a higher user-selected value (100% in this case) of additional available chroma is provided in areas where the source orange chroma is at least 50. On the other hand, maximum green chroma expansion for all features in the green hue sector (i.e., features having either high or low source green chroma) may perhaps be acceptable, in order to provide vibrant color to the lime, if for example there is so little green in the basket in the source image that maximum expansion in all areas still provides a pleasing image. Such a chroma expansion function is shown in FIG. 3. Similarly, the user may define chroma expansion functions for orange and/or blue.

Chroma Expansion as a Function of Source Lightness

In some situations, it may be desirable to define chroma expansion as a function of the level of lightness in any particular part of the image. For example, an advertising image might depict a light-skinned person wearing a darker red sweater. In order to emphasize the vibrant color of the sweater, it may be desirable to provide maximum chroma expansion in the orange sector. However, maximum orange chroma expansion in all areas of the image may result in excessive orange chroma in the person's face.

In such a situation, the user may, for example, select an orange chroma expansion function that begins to ramp down the added orange chroma at a lightness level of 60, reaching 0% of added chroma in areas of 80 lightness and above (where high lightness numbers represent the lightest image features). The light-skinned person's face, which might typically have a lightness level of more than 80, would receive no added orange chroma (i.e., zero orange chroma expansion), while the darker sweater (having a lightness level lower than 60) would receive maximum (100%) orange chroma expansion. (These values, which are selected by the user, are merely exemplary; the user may choose any value that he or she finds suitable.) Similarly, the user may define chroma expansion functions for green and blue as a function of source image lightness.

Chroma Expansion as a Function of Hue

The situation described in the foregoing example might be handled differently if the person wearing the bright red sweater were somewhat darker-skinned, for example a person of Asian heritage. In such a case, it might not be possible to use lightness as the basis of determining chroma expansion, since the skin is darker. Further, in this situation, defining the level of orange chroma expansion as a function of source orange chroma, for example using a function such as that shown in FIG. 2, might result in excessive orange chroma increase in the person's face. This is because the somewhat higher source orange chroma (compared with a light-skinned person) would put it in a region where more expansion occurred. Therefore, in this situation the user may choose to define orange expansion as a function of hue. Compared with the sweater, skin has a yellowier hue. Hence, the user may define orange chroma expansion as a function of the specific hue within the orange sector in such a way as to avoid expanding the chroma of yellows while still maximizing the chroma expansion of red features. An example of such an expansion function may be seen in FIG. 4. The hue on the abscissa of FIG. 4 may be rendered in any of a number of ways, including for example absolute hue (H in the CIE LCH domain, expressed in degrees).

In an alternative embodiment an approximate hue may be used, being defined as a numerical value indicating the relative contributions of the two largest primary chromatic components of the pixel. For example, in the orange sector it might represent the percentage of magenta in the pixel, so that the hue would be given a value of 100 for magenta, zero for yellow, and 50 for a pixel in the orange sector with equal amounts of Y and M. Approximate hue defined in this or an equivalent way has advantages when converting the image via CMY or CMYK using GCR techniques. As discussed previously, such techniques have the advantage of assuring that only one redundant color is used in any given pixel. Using approximate hue assures that the hue adjustment begins and ends exactly at the hue seam. In this way, a hue adjustment in the orange sector (for example) will never affect the green or the blue sectors.

The user may define chroma expansion functions simultaneously with respect to any or all of source lightness, source chroma and hue. If more than one function is applied, the resultant chroma value will be the lesser/least of the values generated by the various applied functions. A user may also mix the above methods, for example defining orange expansion as a function of lightness and green expansion as a function of hue.

Finally it should be noted that in some situations, a user may NOT be able to differentiate image features by reference to lightness, chroma or hue. For example, this might be the case when there is one part of the source image where the user would like to expand chroma (say orange chroma, for a peach) and another part having the same lightness, chroma and hue (a fleshtone, for example) where the user would not like to expand it. In such a situation, the user may apply any of a variety of techniques known in the art to physically isolate the two portions of the image via selection masks, and then apply one chroma expansion function according to the invention to one part of the image and another to the other part.

Figure 4:
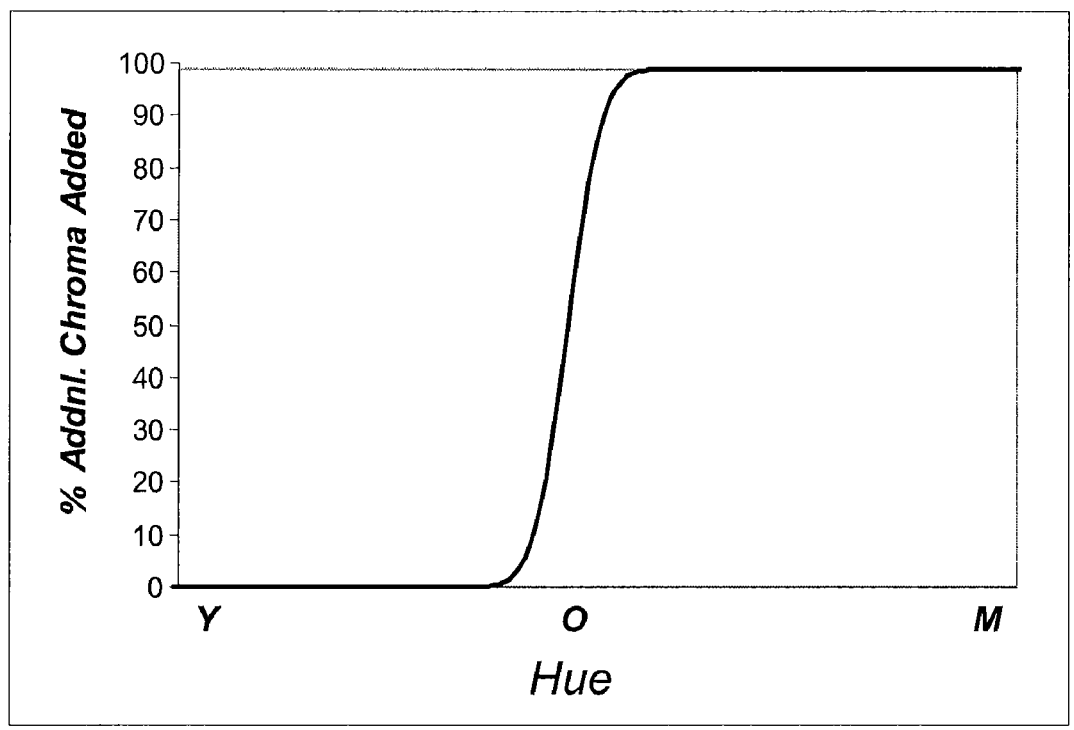
FIG. 4 is a graphical representation of an S-shaped mathematical function defining the amount of added chroma in selected areas as a function of hue, according to the invention.

It should be noted that although FIGS. 2 and 4 depict chroma expansion functions following an S-shaped curve, any mathematical function of added chroma with respect to the X-axis variable (reference lightness, source chroma, or hue) may be used. For example, the 0% and 100% added chroma portions of the function may be connected with a simple straight line rather than a curve. The straight line (or S-shaped curve) may have a steep or gentle slope. Step functions may also be used, or exponential functions or curves that increase from left to right to asymptotically approach 100%. In some embodiments, the function remains constant or decreases as source chroma value of lightness increases. Alternatively, it may remain constant or decrease as source chroma value of lightness increases. In some embodiments, the curve may be parabolic and have a minimum or maximum at some intermediate position, with 100% or 0% values respectively towards the left and right sides. The curve may be a portion of a sine wave. As long as the relationship has only a single value of added chroma for any given value of the independent variable, it is within the scope of this invention.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A method of converting a source image representing a reference image to a digital representation of a preferred image as identified by a viewer, wherein said source image comprises pixels rendered in a first color space and said representation of said preferred image is rendered in an extended gamut destination color space obtainable with a colorant set comprising cyan, magenta, yellow and at least one redundant color other than black, the method comprising the steps of:

a) determining source values of lightness, chroma, and hue for each of the pixels in the source image;
    b) displaying a graphical representation of the source image;
    c) for each pixel in the source image, determining additional available chroma, defined by an absolute or reasonable maximum chroma value attainable in the extended gamut destination color space minus the source chroma value, wherein the absolute maximum chroma value for the digital representation is equivalent to an absolute maximum chroma available in the destination color space, the additional available chroma for a point on a gamut boundary of the source image is defined by the absolute maximum chroma value, and the additional available chroma for a point inside the source image gamut boundary is defined by the reasonable maximum chroma value less than the absolute maximum chroma value;
    d) receiving instructions via a user interface for assigning to each of the pixels a preferred chroma value, comprising the source chroma value plus a percentage of the additional available chroma, the percentage of the additional available chroma for all pixels in at least a portion of the preferred image defined by one or more mathematical functions selected by the viewer dependent upon at least one of the source lightness value, the source chroma value, or the source hue value in the corresponding portion of the source image, said preferred chroma value being within the extended gamut destination color space at said source lightness value and said source hue value, at least some of said pixels having a preferred chroma value greater than the source chroma value;
    e) displaying a graphical representation of the preferred image comprising said preferred chroma values; and
    f) converting the digital representation of the preferred image to the extended gamut destination color space and storing the converted digital representation on a computer readable medium in the form of computer readable code, wherein the converted digital representation represents for each pixel the source lightness value, the source hue value, and the preferred chroma value.

2. The method of claim 1, wherein the reference image is a printed reproduction of CMYK data derived from an original scene.

3. The method of claim 1, wherein the reference image is a monitor display of an expected printed reproduction of CMYK data derived from an original scene.

4. The method of claim 1, wherein the first color space is an RGB color space and the reference image is selected from the group consisting of original scenes, color transparencies, reflection prints, and monitor displays.

5. The method of claim 1, wherein the first color space is a CMYK color space.

6. The method of claim 5, wherein the reference image is a printed reproduction of CMYK data derived from an original scene.

7. The method of claim 5, further comprising, prior to step a), a step of determining LAB values for pixels in the source image; and after step b) but before step c) a step of determining LAB values corresponding to the source lightness values, source hue values, and preferred chroma values; wherein the digital representation of step c) is defined by these LAB values.

8. The method of claim 5, further comprising, prior to step a), a step of determining LAB values for pixels in the source image; and after step b) but before step c) a step of determining LAB values corresponding to the source lightness values, source hue values, and preferred chroma values; followed by a further step of determining CMYKOGB values corresponding to these LAB values; wherein the digital representation of step c) is defined by said CMYKOGB values.

9. The method of claim 1, wherein the preferred chroma value is at least as great as the source chroma value.

10. The method of claim 1, wherein the extended gamut destination color space further comprises black.

11. The method of claim 1, wherein said at least one redundant color is selected from the group consisting of orange, green and blue.

12. The method of claim 1, wherein said at least one redundant color comprises orange, green and blue.

13. The method of claim 1, further comprising displaying a graphical representation of the mathematical function.

14. The method of claim 1, wherein the mathematical function is dependent upon the source chroma value, and the mathematical function remains constant or increases as source chroma value increases.

15. The method of claim 1, wherein the mathematical function is dependent upon source lightness value, and the mathematical function remains constant or increases as source lightness value increases.

16. The method of claim 1, wherein the mathematical function is dependent upon source lightness value, and the mathematical function remains constant or decreases as source lightness value increases.

17. The method of claim 1, wherein the mathematical function is dependent upon source hue.

18. The method of claim 1, wherein the hue is absolute hue according to a CIE LAB, LCH, or other color representation specification.

19. The method of claim 1, wherein the hue is an approximate hue defined as a weighted average of the two largest of the three primary chromatic components of the pixel, wherein the three primary chromatic components are cyan, magenta and yellow.

20. The method of claim 1, further comprising rendering the preferred image in a printing press color space.

21. The method of claim 20, further comprising printing the preferred image rendered in the printing press color space.

22. The method of claim 1, wherein the additional available chroma is defined by an empirically derived reasonable maximum chroma.

23. The method of claim 1, wherein the reasonable maximum chroma is defined by using Grey Component Replacement for the chromatic components and setting the chromatic components at the gamut boundary for the extended gamut destination color space.

24. The method of claim 1, comprising the steps of:
i) rendering the source image in CMYK format;
ii) separating CMYK components of the source image into chromatic and achromatic components, said achromatic components comprising at least black;
iii) determining LCH from the two largest chromatic components;
iv) determining the absolute maximum chroma from a color profile of the extended gamut color space;
v) determining preferred image LCH corresponding to the user instructions received via the user interface in step (d);
vi) determining a corresponding 3-color value for said preferred image LCH consisting of said two largest chromatic components and a redundant color that corresponds to said two largest chromatic components; and
vii) combining the 3-color value with at least the black achromatic component to form each pixel of the preferred image comprising at most 5 colors;
viii) storing said digital representation in step (f) using said at most 5 colors.

25. The method of claim 24, further comprising after step vii) and before step viii), a step of adjusting the pixel of the preferred image comprising:
looking up the pixel of the preferred image in a color profile corresponding to the expanded gamut color space to determine corresponding LCH values; and
adjusting the color values in step vii) through repetitive profile searching such that the L and H of the final pixel match those of the source pixel.

26. The method of claim 24, wherein step ii) comprises 100% Grey Component Replacement (GCR).

27. The method of claim 24, wherein step ii) comprises no grey component replacement or less than 100% grey component replacement.

28. The method of claim 1, wherein the step of assigning to each of the pixels a preferred chroma value comprises the substeps of:
(i) assigning a preliminary preferred chroma value for each pixel;
(ii) displaying an intermediate graphical representation of the preferred image using the preliminary preferred chroma values,
(iii) receiving user instructions redefining the preferred chroma values by adding to the source chroma values a user-defined percentage of additional available chroma for one or more pixels in at least a portion of the preferred image, thereby creating intermediate preferred chroma values;
(iv) displaying an updated intermediate graphical representation of the preferred image using said intermediate preferred chroma values,
(v) repeating steps (iii) and (iv) until the user accepts the updated intermediate graphical representation of the preferred image having said intermediate preferred chroma values as a final graphical representation of the preferred image comprising the preferred chroma value for each of the pixels.

29. The method of claim 1, wherein the percentage of additional available chroma is defined by the one or more mathematical functions selected by the viewer for all pixels in only a portion of the preferred image.

30. The method of claim 1, wherein the percentage of additional available chroma is defined by the one or more mathematical functions selected by the viewer for all pixels in the preferred image.

31. The method of claim 1 further comprising providing a user interface that permits the user to view separate images for each color in the colorant set.

32. A non-transitory computer readable medium comprising, in the form of computer readable code, a digital representation of a preferred image prepared by the method of claim 1.

33. A non-transitory computer readable medium comprising, in the form of computer readable code, a digital representation of a preferred image prepared by the method of claim 24.

34. A non-transitory computer readable medium comprising computer readable code capable of converting a source image representing a reference image to a digital representation of a preferred image according to the method of claim 1.

35. A non-transitory computer readable medium comprising computer readable code capable of converting a source image representing a reference image to a digital representation of a preferred image according to the method of claim 24.

* * * * *